United States Patent
Quinn et al.

(10) Patent No.: US 12,181,225 B2
(45) Date of Patent: Dec. 31, 2024

(54) LIGHTWEIGHT CARBON FOAM STRUCTURE FOR PHASE CHANGE MATERIAL HEAT SINKS

(71) Applicant: Hamilton Sundstrand Corporation, Charlotte, NC (US)

(72) Inventors: Gregory John Quinn, Windsor, CT (US); Jesse Joseph Stieber, Avon, CT (US); Allison Bender Thomas, Hampden, MA (US); Joseph C. Rampone, Colchester, CT (US); Sagar Thapa, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/308,923

(22) Filed: Apr. 28, 2023

(65) Prior Publication Data
US 2023/0266073 A1    Aug. 24, 2023

Related U.S. Application Data

(62) Division of application No. 17/328,449, filed on May 24, 2021, now abandoned.

(51) Int. Cl.
*F28D 20/02* (2006.01)
*B23P 15/26* (2006.01)

(52) U.S. Cl.
CPC ............ *F28D 20/023* (2013.01); *B23P 15/26* (2013.01)

(58) Field of Classification Search
CPC .......... Y10T 29/4935; Y10T 29/49353; B23P 15/26; F28D 20/023
See application file for complete search history.

(56) References Cited

U.S. PATENT DOCUMENTS

| | | | |
|---|---|---|---|
| 6,037,032 A | | 3/2000 | Klett et al. |
| 6,503,626 B1 | * | 1/2003 | Norley ................ H01L 21/4882 165/905 |
| 6,656,443 B2 | | 12/2003 | Klett |
| 7,316,262 B1 | | 1/2008 | Rini et al. |
| 2005/0007740 A1 | * | 1/2005 | Neuschuetz ........ H01L 23/4275 257/E23.089 |
| 2007/0175609 A1 | | 8/2007 | Christ et al. |
| 2010/0201241 A1 | | 8/2010 | Weaver et al. |
| 2012/0240919 A1 | | 9/2012 | Baumann |
| 2013/0008638 A1 | | 1/2013 | Quinn et al. |
| 2013/0264023 A1 | * | 10/2013 | Hudler .................. F28D 20/023 432/9 |
| 2016/0209124 A1 | | 7/2016 | Da Silvaa et al. |

(Continued)

FOREIGN PATENT DOCUMENTS

| | | | |
|---|---|---|---|
| EP | 2543950 A2 | 1/2013 | |
| WO | WO-9804644 A1 * | 2/1998 | ............... C09K 5/06 |
| WO | 2020197982 A1 | 10/2020 | |

OTHER PUBLICATIONS

WO-9804644-A1 Eska et al. English Translation (Year: 1998).*
European Search Report for Application No. 22175077.1, mailed Oct. 7, 2022, 5 Pages.

*Primary Examiner* — Jason L Vaughan
(74) *Attorney, Agent, or Firm* — CANTOR COLBURN LLP

(57) ABSTRACT

A phase change material heat sink including: a carbon graphite matrix having one or more removed portions; and an expanded graphite located within the one or more removed portions.

8 Claims, 3 Drawing Sheets

(56) References Cited

U.S. PATENT DOCUMENTS

| | | |
|---|---|---|
| 2017/0219294 A1 | 8/2017 | Longis et al. |
| 2018/0187977 A1 | 7/2018 | Kock et al. |
| 2020/0339423 A1 | 10/2020 | Lin et al. |
| 2022/0373267 A1 | 11/2022 | Quinn et al. |

* cited by examiner

LIGHTWEIGHT CARBON FOAM STRUCTURE FOR PHASE CHANGE MATERIAL HEAT SINKS

CROSS-REFERENCE TO RELATED APPLICATIONS

This application is a division of U.S. application Ser. No. 17/328,449 filed May 24, 2021, the disclosure of which is incorporated herein by reference in its entirety.

BACKGROUND

The subject matter disclosed herein relates generally to the field of heat sinks, and specifically to phase change material heat sinks.

Phase change material (PCM) heat sinks utilize PCMs such as water, wax, or other materials with desirable melting points to store and release heat energy associated with the solid-liquid phase change. The energy associated with such a change is generally referred to as the latent heat of fusion. One type of PCM heat sink uses a heat transport fluid to carry thermal energy into and out of the heat sink. The fluid flows through a fluid passage element that bring the fluid into thermal contact with the PCM to allow heat transfer to occur while keeping the fluid isolated from the PCM.

BRIEF SUMMARY

According to one embodiment, a phase change material heat sink is provided. The phase change material heat sink including: a carbon graphite matrix having one or more removed portions; and an expanded graphite located within the one or more removed portions.

In addition to one or more of the features described above, or as an alternative, further embodiments may include a sealed chamber. The carbon graphite matrix is located within the sealed chamber.

In addition to one or more of the features described above, or as an alternative, further embodiments may include a phase change material located within the sealed chamber. The phase change material embedded within the carbon graphite matrix and the expanded graphite.

In addition to one or more of the features described above, or as an alternative, further embodiments may include that the one or more removed portions are holes.

In addition to one or more of the features described above, or as an alternative, further embodiments may include that the one or more removed portions are channels.

In addition to one or more of the features described above, or as an alternative, further embodiments may include that the expanded graphite fills a selected percentage of the one or more removed portions.

In addition to one or more of the features described above, or as an alternative, further embodiments may include that the selected percentage is less than or equal to 10 percent.

In addition to one or more of the features described above, or as an alternative, further embodiments may include that the selected percentage is equal to 10 percent.

According to another embodiment, a method of manufacturing a phase change material heat sink is provided. The method including: obtaining a carbon graphite matrix having one or more removed portions; and inserting an expanded graphite into the one or more removed portions.

In addition to one or more of the features described above, or as an alternative, further embodiments may include forming the carbon graphite matrix having the one or more removed portions.

In addition to one or more of the features described above, or as an alternative, further embodiments may include machining one or more holes in the carbon graphite matrix to form the one or more removed portions.

In addition to one or more of the features described above, or as an alternative, further embodiments may include machining one or more channels in the carbon graphite matrix to form the one or more removed portions.

In addition to one or more of the features described above, or as an alternative, further embodiments may include inserting the carbon graphite matrix and the expanded graphite into a sealed chamber.

In addition to one or more of the features described above, or as an alternative, further embodiments may include inserting a phase change material into the carbon graphite matrix and the expanded graphite located within the sealed chamber.

In addition to one or more of the features described above, or as an alternative, further embodiments may include that the expanded graphite fills a selected percentage of the one or more removed portions.

In addition to one or more of the features described above, or as an alternative, further embodiments may include that the selected percentage is less than or equal to 10 percent.

In addition to one or more of the features described above, or as an alternative, further embodiments may include that the selected percentage is equal to 10 percent.

In addition to one or more of the features described above, or as an alternative, further embodiments may include inserting a phase change material into the carbon graphite matrix simultaneously with the expanded graphite.

In addition to one or more of the features described above, or as an alternative, further embodiments may include inserting a phase change material into the carbon graphite matrix simultaneously with the expanded graphite via a vacuum.

In addition to one or more of the features described above, or as an alternative, further embodiments may include inserting a phase change material into the carbon graphite matrix and the expanded graphite via a vacuum.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
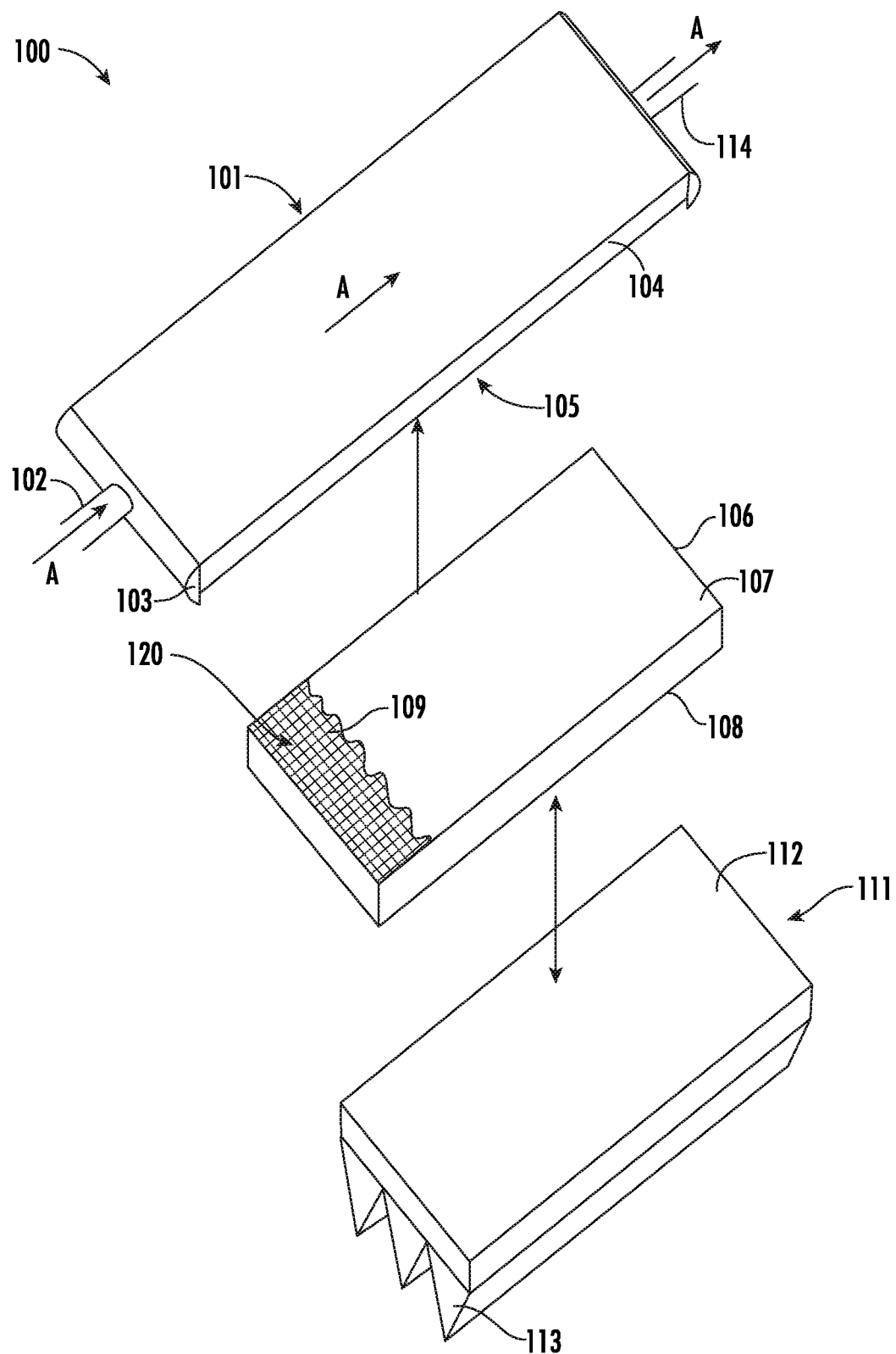
FIG. 1 illustrates an exploded view of an PCM heat sink, according to an embodiment of the present disclosure.

Referring now to FIG. 1, an exploded view of an PCM heat sink 100 is illustrated, according to an embodiment of the present disclosure. It is understood that the PCM heat sink 100 illustrated in FIG. 1 is an example configuration and the embodiments disclosed herein may be applicable to PCM heat sinks having different configurations. In an embodiment, PCM heat sink may use conduction to receive thermal energy directly from a source, such as, for example, an electronics enclosure. The PCM heat sink 100 includes a sealed chamber 106. This sealed chamber 106 includes a carbon graphite matrix 109 located within the sealed chamber 106 and a PCM 120 such as water or wax sealed within the seal chamber 106. The sealed chamber 106 includes a top 107 and a bottom 108. In FIG. 1, the sealed chamber 106 is illustrated such that the PCM 120 is visible. However, it shall be understood that in practice, the top 107 is formed of solid material and that the PCM 120 may not be visible.

The PCM heat sink 100 also includes a fluid passage element 101. A heat transmission fluid enters (e.g., Freon or water, for example) an end 103 of the fluid passage element 101 via inlet passage (e.g., pipe) 102 and exits it via outlet passage 114. The fluid generally traverses the fluid passage element 101 in the direction shown by arrow A. The fluid passage element 101 illustrated in FIG. 1 includes a connector portion 104 arranged between the ends 103 through which the fluid passes while traversing from the inlet passage 102 to the outlet passage 114. The connector portion 104 in particular, and the fluid passage element 101 generally, includes a bottom 105. When the PCM heat sink 100 is assembled, the top 107 of the sealed chamber 106 is in thermal contact with the bottom 105 of the fluid passage element 101.

The PCM heat sink 100 also optionally include a heat release element 111. As illustrated, the heat release element 111 includes heat diffusion fins 113 and a top 112. In some cases, the heat release element 111 can be brought into thermal contact with the sealed chamber 106 to dissipate heat stored therein. For example, in the context of a satellite, heat may be stored in the sealed chamber 106 until the satellite is not in line-of-sight with the sun. At that time, the bottom 108 of the sealed chamber 106 can be brought into contact with the top 112 of the heat release element 111 and the heat can be released via fins 113 into space.

The PCM 120 is located within the sealed chamber 105 and is embedded within the carbon graphite matrix 109. In an embodiment the PCM 120 may be wax or paraffin wax. The carbon graphite matrix 109 is configured to shape-stabilize the PCM 120 and also increase the thermal conductivity of the PCM 120. The carbon graphite matrix 109 conducts heat better than the PCM 120 and may distribute heat better through the PCM 120 than just using PCM 120 alone without a carbon graphite matrix 109.

The carbon graphite matrix 109 is composed of a graphite material forming a monolithic matrix structure, however few options of this material are available, with one of the best having 60% open porosity. It is desirable to increase the percentage of open porosity, which allows for more PCM 120 to be loaded into sealed chamber 106, without compromising the matrices' ability to shape stabilize the PCM 120 during phase transition cycles. The embodiments disclosed herein seek to remove some of the carbon graphite matrix 109 and replace some of the carbon graphite matrix 109 with an expanded graphite 150 (see FIG. 2). Advantageously, by replacing some of the carbon graphite matrix 109 with expanded graphite 150 (see FIG. 2), the volume of PCM 120 can be increased within the sealed chamber 106, providing for higher amounts of latent heat storage.

Figure 2:
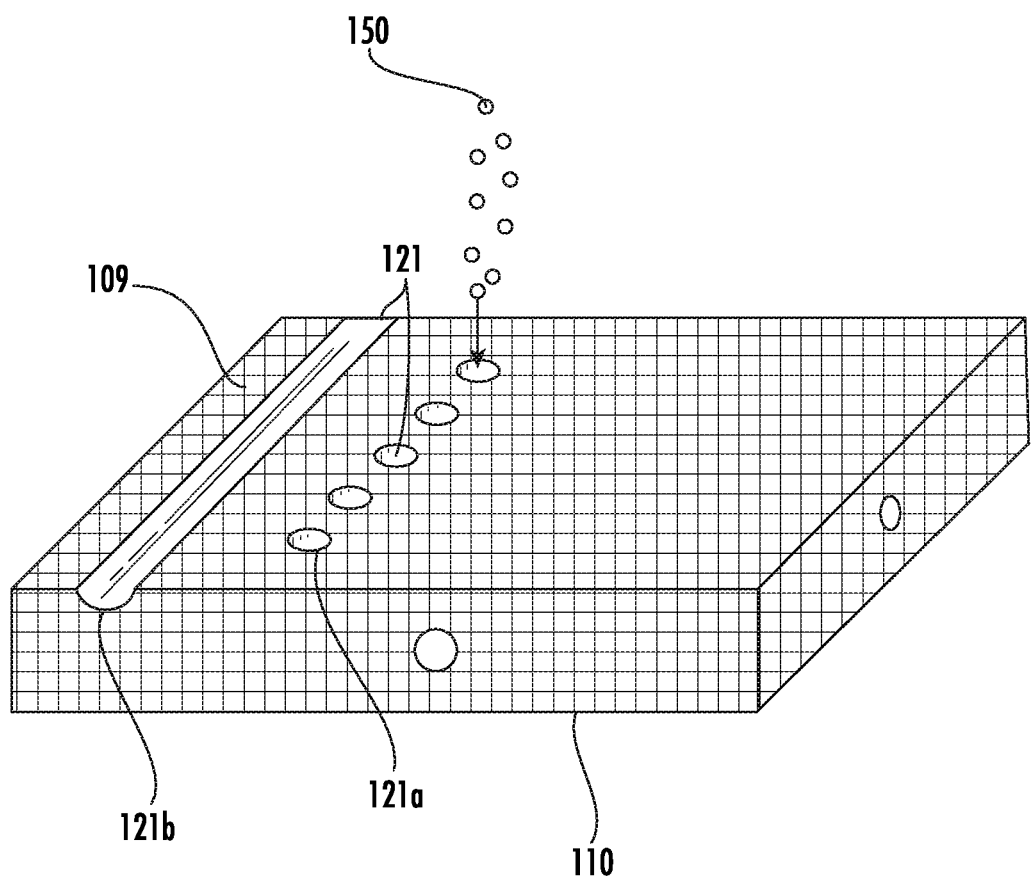
FIG. 2 illustrates an isometric view of a carbon graphite matrix, in accordance with an embodiment of the present disclosure.

Referring not to FIG. 2, with continued reference to FIG. 1, a carbon graphite matrix 109 is illustrated in accordance with an embodiment of the present disclosure. The carbon graphite matrix 109 may be a monolithic matrix structure composed of a single material. The carbon graphite matrix 109 may have a porosity between 95% and 50%. For example, porosity of 95% would mean that the carbon graphite matrix 109 is 5% of the volume, with 95% of the volume being open space. The carbon graphite matrix 109 of FIG. 2 includes removed portions 121 where a portion of the carbon graphite matrix 109 has been removed. The portion of the carbon graphite matrix 109 may have been removed via drilling, machining, or any other manufacturing process. In an embodiment, the removed portion 121 may be a hole 121a. The hole 121a may extend completely through or partially through the carbon graphite matrix 109. In another embodiment, the removed portion 121 may be a channel 121b. The channel 121b may extend completely through or partially through the carbon graphite matrix 109. In an embodiment, there may any number of removed portions 121. The removed portions 121 may also be located on any side 110 of the carbon graphite matrix 109. The removed portions 121 are then back filled to a selected percentage with an expanded graphite 150. The selected percentage is a percentage of the removed portions 121 and may be measured between 0%-100%. At 0% none of the removed portions 121 are filled with any expanded graphite 150 and at 100% all of the removed portions 121 are completely filled with the expanded graphite 150. The PCM 120 is located within the sealed chamber 105 and is embedded within the carbon graphite matrix 109 and the expanded graphite 150. The expanded graphite 150 may have a porosity between 2% and 20%. In an embodiment, the expanded graphite has a porosity of 10%.

The carbon graphite matrix 109 has an effective conductivity higher than an effective conductivity of the expanded graphite 150. As the carbon graphite matrix 109 is removed and replaced with expanded graphite 150 the effective conductivity of the combination of the carbon graphite matrix 109 and the expanded graphite 150 will decrease but the addition of the expanded graphite will allow the volume available for the PCM 120 to increase, thus giving the PCM 120 more thermal capacity. Thus, using all carbon graphite matrix 109 results in high effective conductivity but low available volume for the PCM 120, whereas using all expanded graphite 150 results in low effective conductivity but more available volume for the PCM 120.

Therefore, the removed portions 121 of FIG. 2 should remove some but not all of the carbon graphite matrix 109 and replace it with a selected percentage expanded graphite 150 to increase the available volume for the PCM 120 while maintaining a high effective conductivity. In an embodiment, the selected percentage of expanded graphite 150 may be between about 0 and 10% of the removed portion 121. In another embodiment, the selected percentage of expanded graphite 150 may be between about 5% and 10% of the removed portion 121. In an embodiment, the selected percentage of expanded graphite 150 may be about 10% of the removed portion 121.

Figure 3:
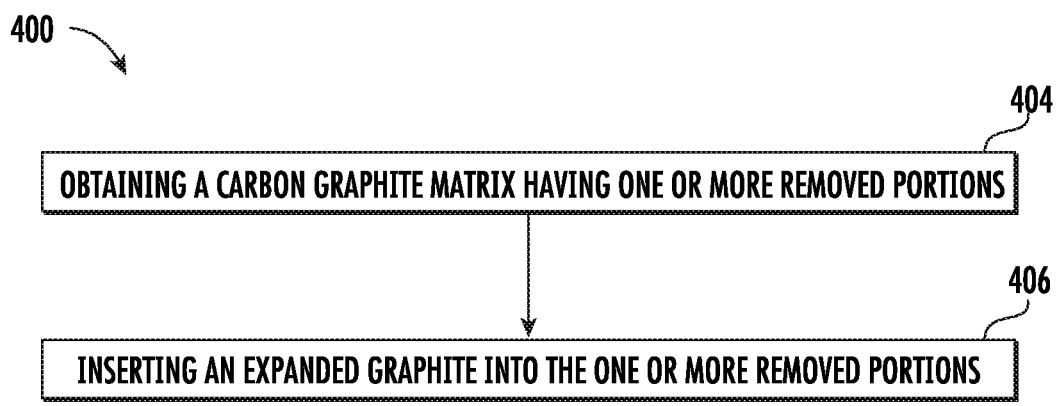
FIG. 3 illustrates a flow chart of a method of manufacturing the PCM heat sink, in accordance with an embodiment of the present disclosure.

Referring now to FIG. 3, with continued reference to FIGS. 1-2, a flow chart of method 400 of manufacturing a PCM heat sink 100 is illustrated, in accordance with an embodiment of the disclosure.

At block 404, a carbon graphite matrix 109 having one or more removed portions 121 is obtained. At block 406, an expanded graphite 150 is inserted into the one or more removed portions 121. The expanded graphite 150 may fill a selected percentage of the one or more removed portions 121. The selected percentage may be less than or equal to 10 percent. The selected percentage may be equal to 10 percent.

The method 400 may further include forming the carbon graphite matrix 109 having one or more removed portions 121 In another embodiment, the carbon graphite matrix 109 and the one or more removed portions 121 may be formed by machining one or more holes 121*a* in the carbon graphite matrix 109 to form the one or more removed portions 121. In another embodiment, the carbon graphite matrix 109 and the one or more removed portions 121 may be formed by machining one or more channels 121*b* in the carbon graphite matrix 109 to form the one or more removed portions 121.

The method 400 may also include inserting the carbon graphite matrix 109 and the expanded graphite 150 into a sealed chamber 106. The method 400 may also include inserting a PCM 120 into the carbon graphite matrix 109 and the expanded graphite 150 that are located within the sealed chamber 106.

The PCM 120 may be inserted into the carbon graphite matrix 109 simultaneously with the expanded graphite 150. For example, the PCM 120 may be inserted into the carbon graphite matrix 109 simultaneously with the expanded graphite 150 via a vacuum. The PCM 120 may be mixed into a slurry with the expanded graphite 150 to be inserted into the carbon graphite matrix 109 simultaneously.

Alternatively, the expanded graphite 150 may be inserted into the carbon graphite matrix 109 prior to the PCM 120. For example, the expanded graphite 150 may be mixed into the carbon graphite matrix 109 and then the PCM 120 may be inserted into the carbon graphite matrix 109 and the expanded graphite 150 via a vacuum.

While the above description has described the flow process of FIG. 3 in a particular order, it should be appreciated that unless otherwise specifically required in the attached claims that the ordering of the steps may be varied and the order of the steps may occur simultaneously or near simultaneously, such as in layers.

Technical effects and benefits of the features described herein include removing a selected portion of a carbon graphite matrix and replacing with expanded graphite 150 to increase the volume available for PCM and thermal capacity while not compromising too much on conductivity.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a phase change material (PCM) heat sink, the method comprising:

obtaining a carbon graphite matrix;

after obtaining the carbon graphite matrix, machining the graphite matrix to remove one or more portions therefrom to form one or more removed portions such that the carbon graphite matrix is a modified carbon graphite matrix having a porosity between 50% and 95%; and inserting an expanded graphite into the one or more removed portion of the modified carbon graphite matrix, wherein the expanded graphite fills a selected percentage of the one or more removed portions; and wherein the selected percentage is less than or equal to 10 percent; and inserting a PCM into the one or more removed portions.

2. The method of claim 1, wherein machining includes machining one or more holes in the carbon graphite matrix to form the one or more removed portions.

3. The method of claim 1, wherein machining includes machining one or more channels in the carbon graphite matrix to form the one or more removed portions.

4. The method of claim 1, further comprising:

inserting the modified carbon graphite matrix and the expanded graphite into a sealed chamber.

5. The method of claim 4, further comprising:

inserting a phase change material into the modified carbon graphite matrix and the expanded graphite located within the sealed chamber.

6. The method of claim 4, further comprising:

inserting a phase change material into the modified carbon graphite matrix simultaneously with the expanded graphite.

7. The method of claim 4, further comprising:

inserting a phase change material into the modified carbon graphite matrix simultaneously with the expanded graphite via a vacuum.

8. The method of claim 4, further comprising:

inserting a phase change material into the modified carbon graphite matrix and the expanded graphite via a vacuum.

* * * * *